United States Patent [19]

Meidl et al.

[11] Patent Number: 4,620,563
[45] Date of Patent: Nov. 4, 1986

[54] BLOWDOWN POT FOR A REACTOR

[75] Inventors: John A. Meidl; Thomas J. Vollstedt, both of Schofield, Wis.

[73] Assignee: Zimpro Inc., Rothschild, Wis.

[21] Appl. No.: 402,150

[22] Filed: Jul. 26, 1982

Related U.S. Application Data

[63] Continuation of Ser. No. 130,361, Mar. 14, 1980, abandoned, which is a continuation-in-part of Ser. No. 6,260, Jan. 23, 1979, abandoned, which is a continuation-in-part of Ser. No. 747,073, Dec. 2, 1976, abandoned, which is a continuation-in-part of Ser. No. 552,046, Feb. 24, 1975, abandoned.

[51] Int. Cl.$^4$ .................. F16K 24/00; C10B 39/04
[52] U.S. Cl. ..................... 137/572; 137/589; 48/206; 110/165 R; 202/261
[58] Field of Search ............. 137/572, 589; 110/165 R; 48/206; 202/261; 220/537, 539, 218

[56] References Cited

U.S. PATENT DOCUMENTS

| | | | |
|---|---|---|---|
| 3,017,259 | 1/1962 | Eastman | 48/206 |
| 3,150,105 | 9/1964 | Ledding | 252/416 |
| 3,231,090 | 1/1966 | Ferrari | 210/539 |
| 3,867,110 | 2/1975 | Schora et al. | 48/206 |
| 3,884,649 | 5/1975 | Matthews | 48/206 |
| 3,994,702 | 11/1976 | Schweimanns et al. | 110/165 R |

Primary Examiner—Alan Cohan
Assistant Examiner—John A. Rivell
Attorney, Agent, or Firm—Charles R. Fay

[57] ABSTRACT

A blowdown pot is provided with an inlet pressure control valve through which the pot receives unwanted residue e.g., ash from a high pressure chemical reactor, and this reactor residue can thereby be continuously or semi-continuously blown out from the high pressure, high temperature chemical reactor into the relatively low pressure blowdown pot which includes means maintaining a liquid level therein minimizing steam flashing and vessel wear. At the same time the reactor residue is removed from the pot with a liquid overflow.

5 Claims, 1 Drawing Figure

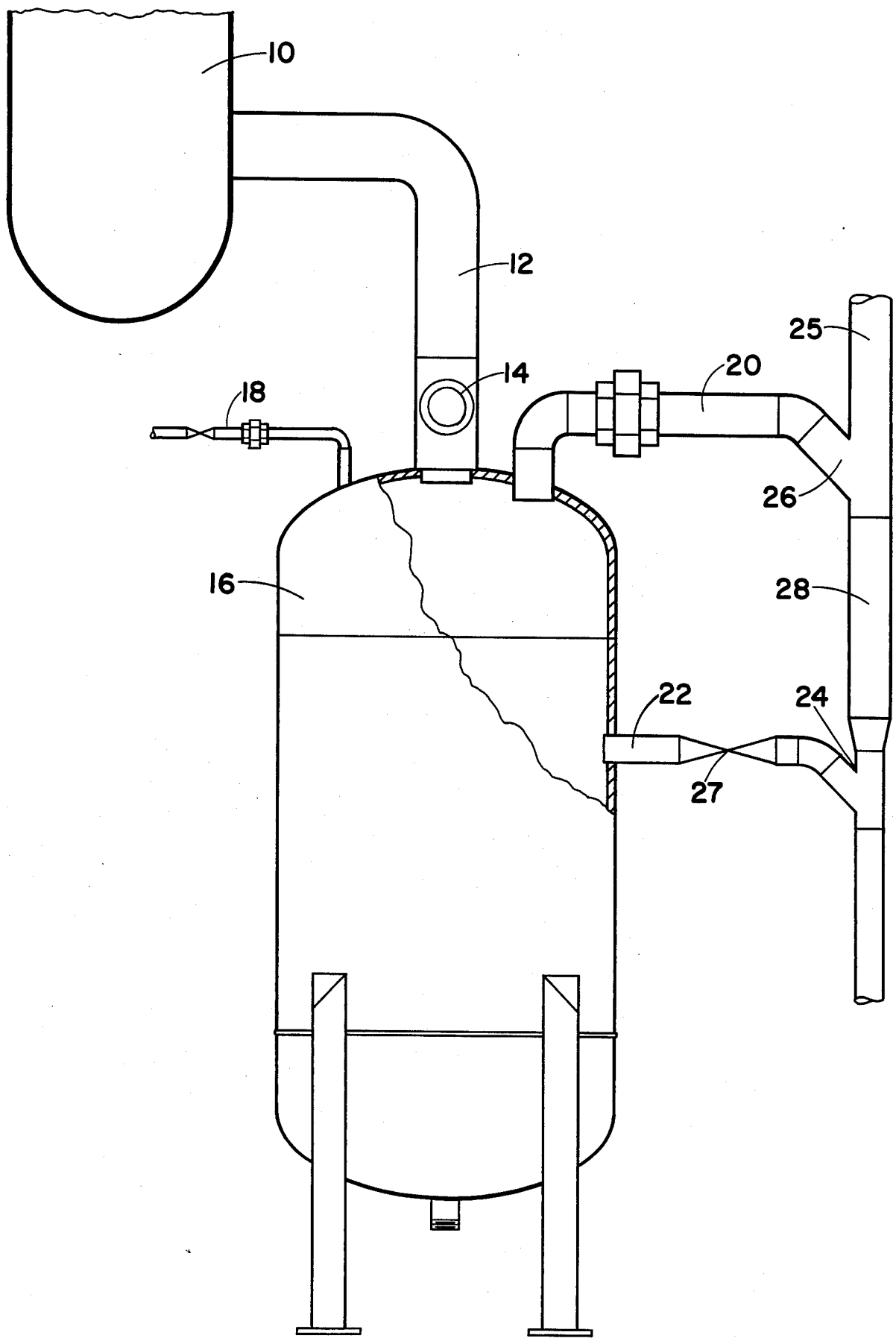

BLOWDOWN POT FOR A REACTOR

This application is a continuation of copending application Ser. No. 130,361, filed Mar. 14, 1980, now abandoned, in turn a continuation-in-part of application Ser. No. 006,260, filed Jan. 23, 1979, now abandoned, in turn a continuation-in-part of application Ser. No. 747,073, filed Dec. 2, 1976, now abandoned, in turn a continuation-in-part of application Ser. No. 552,046, filed Feb. 24, 1975, now abandoned.

BACKGROUND OF THE INVENTION

Chemical pressure reactors have been used at elevated temperatures for oxidation, such as regenerating carbon for a wastewater reclamation system, or for materials conditioning, such as thermal sludge conditioning, for wastewater sludge treatment, all of which require periodic ash removal. It is a troublesome operation to actuate the cleanout valve at the bottom of the reactor, particularly because a reduction in pressure to a level below its vapor pressure results in flashing, and it is the object of the present invention to provide a continuous or semi-continuous cleanout by the use of a special blowdown pot having a control valve and vents for venting vapor and water containing the ash, maintaining a liquid level in the blowdown pot. The pressure within the chemical reactor is relatively high as compared with the pressure in the blowdown pot, whereby the residue, including water and ash from the reactor, is blown downwardly into the blowdown pot.

SUMMARY OF THE INVENTION

In the present invention a continuous or semi-continuous cleanout operation is provided by simply operating a control valve leading from the bottom of a chemical reactor, e.g. a wet oxidation powdered carbon regenerating reactor, into a blowdown pot. A liquid supply provides at least a minimum water level always receiving the residue ash in the form of a slurry which impinges on the liquid in the blowdown pot preventing damage to the walls of the vessel, and controls steam flashing and internal vessel pressure. The blowdown pot is provided with vents for the vapor and the residue slurried ash, thereby maintaining a liquid level in the blowdown pot. The overflow of liquid carries off the reactor residue ash in a continuous manner simply by gravity. A water flush may also be provided for in the blowdown pot. The blowdown pot is so-called because the reactor is utilized under relatively high pressure and temperature, and the residue thus blows down into the pot which has a relatively lower pressure.

BRIEF DESCRIPTION OF THE DRAWING

The FIGURE is a diagram illustrating the invention.

PREFERRED EMBODIMENT OF THE INVENTION

In the drawing the reference numeral 10 indicates a chemical reactor of any kind wherein a residue or slurry comprising ash is produced. One field in which the present invention is particularly useful is in carbon regeneration in a wet oxidation system, but, of course, the invention may be useful wherever it is desired to more easily dispose of reactor residue such as ash.

The ash or residue is blown out from the reactor 10 in a slurry form through a conduit or the like 12 being controlled by a variable pressure control valve 14 therein leading into the blowdown pot indicated at 16. The blowdown pot has a water inlet 18, a vapor outlet or vent 25, and a residue ash and water outlet 22 and/or 20 which is connected with respect to the vapor vent as at 24 or 26.

The pressure control valve 14 can be set, or varied at will, to the content of reactor residue which is adjudged most efficient to be withdrawn by the blowdown pot; or this valve may be closed and opened at intervals as may be found convenient or efficient. In any event the residue slurry and flashed liquid are forced into the blowdown pot under considerable pressure from the reactor and impinge upon water in the blowdown pot thereby preventing damage to the walls of the vessel, and vessel wear.

The liquid level within the pot is maintained at a depth to minimize damage. Water and residue (ash) slurry overflows at 22 and is carried off as indicated in the drawing whereas the vapors proceed through the connection 20 as well as that at 22 to the atmosphere. Valve 27, which may be optional, can be operated in the closed position. The pot liquid level would then be at a maximum to control steam flashing and further minimize pot damage. Water, residue (ash) slurry, and vapors would be carried through outlet 20 with vapors vented through pipe 25 and the remainder through pipe 28.

Thus it will be seen that simply by operating valve 14, reactor residue is very easily taken care of, and in some installations may be on a continuous basis with no attention paid, the water level being kept to the level as specified above; whereas in other installations it may be found better to open valve 14 at intervals while maintaining it in closed condition as a general thing.

It is also possible to flush the blowdown pot using water line 18 and an appropriate valve should it be necessary to quench the incoming material or to carry blowdown contents to a distant area. The control valve 14 is provided not only to control the volume but also the velocity of the residue slurry being blown down from the reactor into the blowdown pot.

The following shows a series of examples of different runs at different reactor pressures and temperatures in psig and Fahrenheit temperatures. In each example the blowdown pot pressure was approximately atmospheric and the material leaving the blowdown pot was at a temperature less than 200° F.

| Run No. | Reactor Pressure | Reactor Temp. | Blowdown Quantity | | |
|---|---|---|---|---|---|
| | | | T. Solids % | T. Ash % | Volume Gal. |
| 156 | 200 | 359 | 38.1 | 28.4 | 55 |
| 158 | 650 | 370 | 30.4 | 28.3 | 50 |
| 159 | 650 | 425 | 17.1 | 11.2 | 25 |
| 163 | 750 | 435 | 24.1 | 16.7 | 30 |
| 166 | 760 | 440 | 20.1 | 15.1 | 30 |
| 175 | 800 | 400 | 15.3 | 9.2 | 40 |

We claim:

1. The combination of a high pressure wet oxidation, powdered carbon regeneration reactor, where a slurry including ash is produced as a residue under relatively high pressure and temperature, the reactor having conduit means for conducting said ash residue therefrom under pressure, wherein the pressure difference between the reactor and blowdown pot produces falshing of a portion of the slurry entering the blowdown pot, a blowdown pot including a generally vertical wall located below said reactor, the ash residue conduit means leading downwardly into said blowdown pot, a pressure control valve in said conduit means, means separate from the ash residue conduit means, for supplying liquid to said blowdown pot, and an overflow vent intermediate the top and bottom of said vertical wall in the blowdown pot for overflow by gravity of comined ash residue, liquid and vapors whereby a liquid level in said blowdown pot is maintained for receiving the residue ash in the form of a slurry which impinges on the liquid, the pressure within the blowdown pot being relatively low as compared with the relatively high pressure in the reactor whereby the slurry and flashed liquid are forced from the reactor under relatively high pressure into the blowdown pot, the impingement of the residue upon the liquid in the blowdown pot preventing damage to the walls of the blowdown pot.

2. The combination of claim 1 wherein the reactor pressure may vary between 200 psig and 4,000 psig and the pressure in the blowdown pot is approximately atmospheric.

3. The method for voiding residue from a high pressure wet oxidation, powdered carbon regeneration reactor wherein slurry including ash is produced under relatively high pressure and temperature as a residue, comprising the steps of conducting said residue to a relatively low pressure blowdown pot under conditions of such high pressure, wherein the pressure difference between the reactor and blowdown pot produces flashing of a portion of slurry entering the blowdown pot, controlling the flow of the residue to the blowdown pot in a continuous or semi-continuous manner, maintaining a liquid level in the blowdown pot for receiving the residue in the form of a slurry which impinges on the liquid therein, preventing damage to the walls of the vessel, and overflow venting combined liquid, slurry residue and vapors out of the blowdown pot at said liquid level in a continuous or semi-continuous manner by gravity.

4. The method of claim 3 wherein the step of controlling the flow of the residue to blowdown pot includes variably valving the residue conducted to the blowdown pot.

5. The method of claim 3 wherein the reactor pressure may vary between 200 psig and 4,000 psig and the pressure in the blowdown pot is approximately atmospheric.

* * * * *